June 21, 1938.   R. E. MANLEY   2,121,324
LIQUID LEVEL CONTROL APPARATUS
Filed June 23, 1936
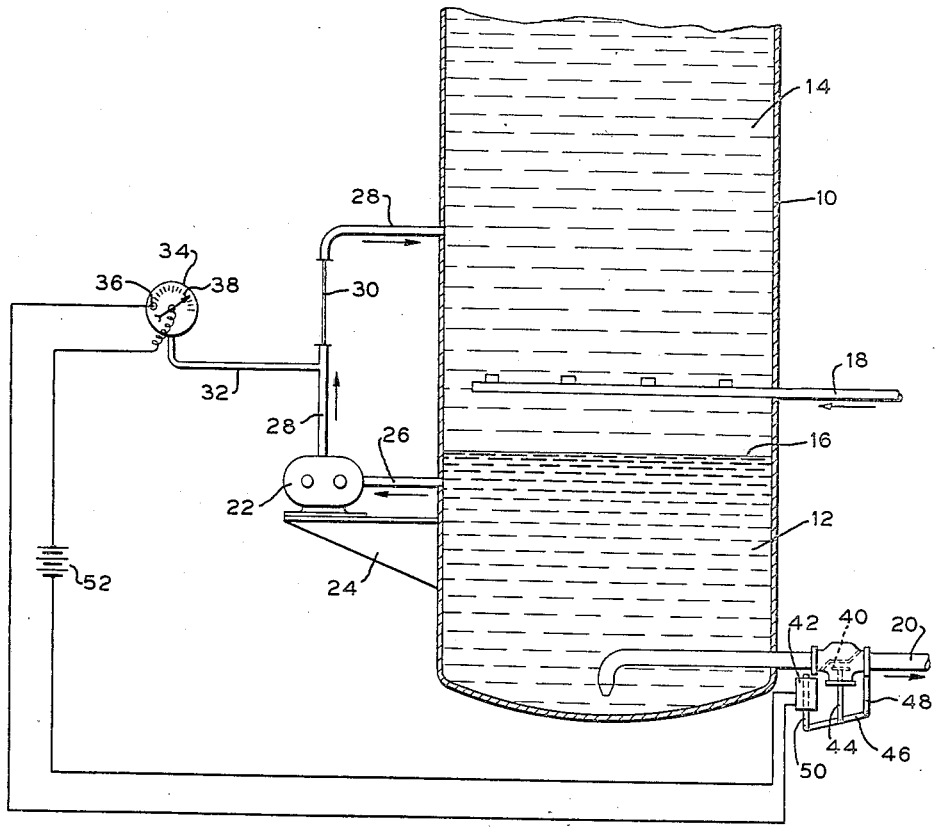
ROBERT E. MANLEY
INVENTOR
BY R. J. Dearborn
HIS ATTORNEY Patented June 21, 1938

2,121,324

UNITED STATES PATENT OFFICE 2,121,324

LIQUID LEVEL CONTROL APPARATUS

Robert E. Manley, Beacon, N. Y., assignor to The Texas Company, New York, N. Y., a corporation of Delaware Application June 23, 1936, Serial No. 86,726

6 Claims. (Cl. 137—68)

This invention relates to apparatus for maintaining a constant liquid level and more particularly to a device for maintaining substantially constant the level of the liquid interface between two liquids having different specific gravities, and viscosities, for example, the interface between the oil undergoing solvent refining treatment and the extract in a solvent refining extraction tower. The principal object of the invention is the provision of control apparatus which is sensitive to small differences in viscosity between two liquids and which will operate automatically and positively to maintain constant the level of the interface between the two liquid layers.

In the solvent refining of hydrocarbon oils, it is common to admit oil to be treated to a vessel or counterflow tower near the lower end thereof and the treated solvent near the upper end, thus providing counterflow of the two liquids. The extract being heavier than the oil-solvent solution, collects in the lower portion of the vessel and may be drawn off therefrom. It is desirable to maintain a certain amount of extract in the vessel and in accordance with this invention apparatus is provided to maintain automatically at a predetermined level the liquid interface occurring between the extract and the oil being treated by the solvent. In the past, float control devices have been tried for this purpose but have often been found unsuitable because of the small difference in specific gravity between the two liquid layers.

In accordance with this invention, the level of the interface between the two liquid layers is maintained substantially constant by employing a sudden change of viscosity as a controlling means. A constant speed pump connected to the vessel below the normal or desired level of the oil-extract interface serves to pump the liquid through a small bore or capillary tube and back into the vessel at another point. In case the interface falls below the pump inlet the lighter oil-solvent solution will be pumped through the capillary tube instead of the extract and the difference in back pressure on the pump will cause a pressure actuated switch to close an electrical circuit, energizing a magnetically operated valve in the extract draw-off line so as to shut off the flow of extract until the level of the interface has been raised.

For a better understanding of the invention, reference may be had to the accompanying drawing in which is shown somewhat diagrammatically an apparatus for accomplishing the aforementioned purpose.

The lower section of a solvent extraction tower or vessel 10 is shown as containing in its lower portion the extract 12 and above the extract the oil-solvent layer 14. The liquid interface between these two layers is designated by the line 16. The oil to be treated enters the tower through the pipe 18 and flows upwardly, generally in the continuous phase, countercurrent to downflowing dispersed particles of solvent which enter the tower near its upper end (not shown). The raffinate, or treated oil, containing a small amount of solvent is also drawn off from the tower near its upper end above the level of solvent entry. When a solvent such as furfural is used, this material being heavier than the oil will, of course, flow downwardly in the tower and a counterflow arrangement is thus provided. The major portion of the solvent containing the naphthenic and other constituents dissolved from the oil by the solvent, collects in the lower portion of the tower and forms the extract 12. The extract may be withdrawn more or less continuously through the draw-off pipe 20, depending, of course, on the rapidity with which it collects in the tower.

A constant speed pump 22 is shown as mounted on a suitable bracket 24, the inlet or suction line 26 to the pump being connected to the tower 10 at a point slightly below the normal or desired level of the interface 16. An outlet conduit 28 leads from the pump to another point in the tower and this conduit contains a restricted portion 30 which may be a small bore or capillary tube. Another conduit 32 connected to the conduit 28 between the pump 22 and the restricted portion 30 leads to a combination pressure gauge and electric switch 34 which latter device may be of any suitable type. As illustrated diagrammatically, the device 34 is provided with suitable indicia for indicating the pressure at the outlet of the pump 22 and also with an electric switch, one terminal of which is shown at 36 while the other terminal comprises the gauge pointer 38.

The draw-off line 20 for the extract is provided with a valve 40 adapted to be operated to its closed position by a suitable electro-magnet or solenoid 42. To this end the valve stem 44 is shown as pivotally connected to a link 46 hinged at one end to a bracket 48 secured in turn to the valve housing. At the other end of the link 46 is attached an armature or core 50 adapted to be drawn into the solenoid 42 when the latter is energized. A suitable source of electricity 52 is shown as connected in circuit with the solenoid 42 and the pressure responsive switch 34.

In operation, assuming that the liquid interface 16 is above the pump intake 26, the pump 22 will force the extract through the outlet conduit 28 and the small tube 30 back to the interior of the tower. Due to the higher viscosity of the extract a certain resistance is met in pumping the solution through the restricted portion 30 and the pointer 38 on the device 34 will indicate an appreciable pressure. During this time the valve 40 will remain open. In case too much of the extract 12 is drawn from the tower the interface 16 will fall below the pump intake 26 whereupon the oil-solvent mix 14 will be pumped through the outlet conduit 28 and the small tube 30. The latter being of lower specific gravity and viscosity will pass through the small tube 30 more readily than the extract solution and the pointer 38 of the gauge 34 will turn counterclockwise, closing the electrical circuit which includes the pointer 38, contact 36, source of electrical supply 52 and the solenoid 42. The solenoid will pull its core 50 upwardly thus closing the valve 40 which will remain closed until the level of the interface 16 has been raised again. When sufficient extract collects in the tower, the interface 16 will again be above the pump inlet 26 and the back pressure on the pump will increase thus causing the pointer 38 to turn clockwise, opening the electrical circuit and allowing the valve 40 to open by gravity.

It will thus be seen that a simple apparatus has been provided which does not necessitate the use of any float control and which, through repetition of the above described operation, will maintain the level of the interface 16 substantially constant. The application of the invention is, of course, not limited to use in conjunction with a solvent extraction tower but may be used in many instances when it is desired to maintain at a predetermined level the interface between two superposed liquids having different specific gravities and viscosities.

While electrical means have been illustrated for controlling the position of the valve 40 in accordance with variations in pressure produced at the discharge side of the pump and in the conduit 32, other means could also be used effectively for accomplishing this purpose. For instance, a combination pressure gauge and fluid flow valve could be substituted for the pressure gauge-electrical switch 34 and the movements of the fluid flow valve caused by variations in pressure would then produce corresponding movements in a pressure responsive device attached to actuate the valve 40.

Obviously many other modifications and variations of the invention may be made without departing from the spirit and scope thereof, and therefore only such limitations should be imposed as are indicated by the appended claims.

I claim—

1. In combination with a vessel containing two superposed liquids having different specific gravities and viscosities, means for maintaining substantially constant the height of the interface between said liquids comprising a pump, the inlet of which is connected to said vessel below the normal position of said interface, a conduit for returning to said vessel the discharge of said pump, a draw-off pipe for the liquid in the lower part of said vessel, a valve in said draw-off pipe, and means responsive to changes in viscosity of the liquid being pumped through said conduit for controlling the actuation of said valve.

2. In combination with a vessel containing two superposed liquids having different specific gravities and viscosities, means for maintaining the interface between said liquids at a substantially constant level comprising a constant speed pump having its inlet connected to said vessel at a point below the normal level of said interface, an outlet conduit for returning the outflow of said pump to said vessel, means connected to said outlet conduit and responsive to changes in viscosity of the liquids passing through said conduit, an outlet pipe for conducting the liquid of higher specific gravity from said tower, a valve in said pipe and electrical means connected to said viscosity responsive means for closing said valve when said liquid of lower specific gravity is pumped through said outlet conduit.

3. In combination with a vessel containing two superposed liquids having different specific gravities and viscosities, means for maintaining the interface between said liquids at a substantially constant level comprising a constant speed pump having its inlet connected to said vessel at a point below the normal level of said interface, an outlet conduit for returning the outflow of said pump to said tower, a restricted passage in said outlet conduit, a pressure responsive switch connected to said outlet conduit between said pump and said restricted passage, a pipe for conducting the liquid of higher specific gravity from said tower, a valve in said pipe, electromagnetic means for actuating said valve, a source of electrical energy, said source, said switch and said magnetic valve actuating means being connected in an electrical circuit, the arrangement being such that when said interface falls below said pump inlet conduit, the drop in pressure at the outlet side of said pump will cause said pressure responsive switch to close whereupon said valve will be closed by said magnetic means.

4. In combination with a vessel containing two liquids having different viscosities, means for maintaining substantially constant the height of the interface between said liquids comprising a pump the inlet of which is connected to said vessel below the normal position of said interface, a conduit connecting the outlet of said pump to said vessel, a restricted passage in said conduit, a pressure responsive electrical switch connected to said conduit between said pump and said restricted passage, a draw-off line for the liquid in said tank having the higher viscosity, a valve in said draw-off line, an electro-magnet for operating said valve, and a source of electricity, said switch, magnet and source of electricity being connected in an electrical circuit and the arrangement being such that in case said interface falls below said pump inlet the liquid of lower viscosity will be pumped through said restricted passage allowing said switch to complete said electrical circuit thereby closing the valve in said draw-off line.

5. In combination with a vessel containing two superposed liquids having different specific gravities and viscosities, means for maintaining substantially constant the height of the interface between said liquids comprising a pump, the inlet of which is connected to said vessel below the normal position of said interface, a conduit for returning the discharge of said pump to said vessel, a draw-off pipe for the liquid forming the lower layer in said vessel, a valve in said draw-off pipe, and means responsive to changes in viscosities of the liquid being pumped through said conduit for controlling the actuation of said valve, said control means including a source of electrical energy, electro-magnetic actuating means for said valve and an electrical switch responsive to the pressure of the liquid being discharged from said pump and connected in circuit with said magnetic actuating means and said source of electrical energy.

6. In combination with a vessel containing two superposed liquids having different specific gravities and viscosities, means for maintaining substantially constant the height of the interface between said liquids comprising a pump, the inlet of which is connected to said vessel below the normal position of said interface, a conduit for returning to said vessel the discharge of said pump, a draw-off pipe for the liquid in the lower part of said vessel, a normally open valve in said draw-off pipe, a normally open electrical circuit including a source of electrical energy, magnetic means connected in said circuit and adapted to actuate said valve to its closed position, and means for closing said circuit on a decrease in the pressure of the liquid being pumped through said conduit, said last mentioned means comprising a circuit making device connected in said circuit and responsive to changes in pressure in said conduit.

ROBERT E. MANLEY.